Figure 1:
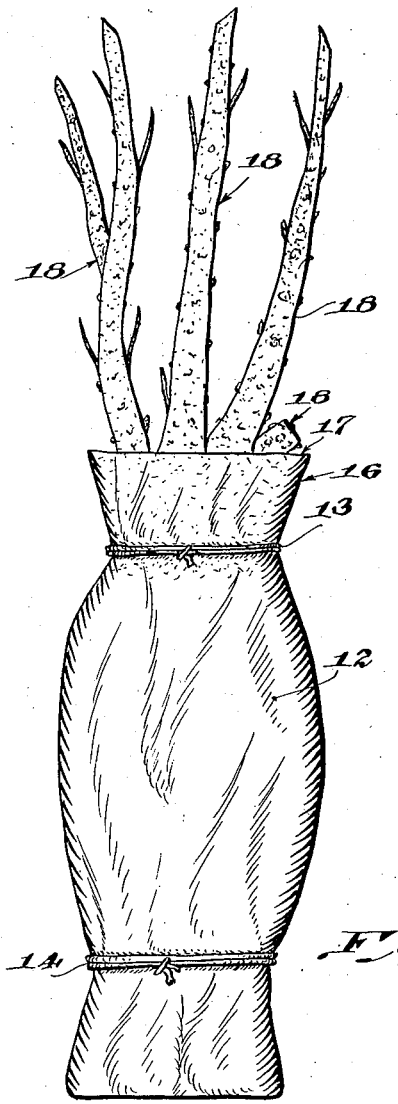

Jan. 17, 1933.　　C. E. WILSON　　1,894,506

WRAPPING FOR PLANTS

Filed June 17, 1931

WITNESS

INVENTOR
Clarence E. Wilson,
BY
ATTORNEY

Patented Jan. 17, 1933

1,894,506

UNITED STATES PATENT OFFICE

CLARENCE ELLSWORTH WILSON, OF MANCHESTER, CONNECTICUT

WRAPPING FOR PLANTS

Application filed June 17, 1931. Serial No. 545,115.

This invention relates to a package for shipping or storing dormant nursery stock, such as deciduous trees, ornamental fruit and nut trees, shrubs, vines, roses, evergreens, etc.

It is the usual custom in sending shrubbery from nurseries to stores to pack the roots in a moss, which will retain moisture within a wrapping of any suitable material, such as paper or burlap in order to maintain the roots moist and in a manner to attempt to preserve the life of the plant. It is well known that such methods are inadequate for the purpose and that the plants come ultimately to the consumer in a state in which the greater portion of the moisture has been eliminated from the plant. In this state the plant either dies or has received such a serious set back that considerable time passes before it is able to send out new shoots or foliage.

It has also been proposed to preserve fruits, vegetables, flowers and leaves by giving them a coating of some form of wax, but in this case no attempt is made to preserve the plant's life temporarily so that it may be transferred from one place to another and still resume its natural functions.

It is an object of the present invention to provide a seal to protect all kinds of dormant nursery stock such as deciduous trees, ornamental, fruit and nut trees, shrubs, vines, roses, evergreens, etc., from injury by evaporation during the period of necessary handling between the time the stock is dug from the nursery up to the time it has re-established itself in the soil for the resumption of its natural functions.

Another object of the invention is the provision of a seal for all portions of dormant nursery stock which will give protection against that trying period which a tree or plant must undergo immediately after transplanting due to the exposure to sun and wind which causes evaporation at a very rapid rate and quite frequently exhausts a plant's vitality before natural circulation is re-established by the formation of new feeder roots.

A further object of the invention is the provision of a package for plants which will not only maintain a sufficient quantity of moisture about the roots for a predetermined time but will protect the stems against loss of moisture while preventing bacteria or insects from attacking the stems during storage or transportation.

A still further object of the invention is the provision of a package for plants in which the roots are covered with water saturated material, with the material being protected by an outer wrapper, the stems being completely encased in a moisture proof material which is extended downwardly into the wrapper thus sealing the inner or open end of the wrapper against loss of moisture.

Another object of the invention is the provision of a process for protecting plants against loss of vitality during storage or transportation, which includes the steps of coating the stems of the plants with a moisture proof coating while at the same time applying the moisture proof coating to a wrapper applied to the roots so that a perfect seal is maintained around the entire plants.

This invention will be best understood from a consideration of the following detailed description, in view of the accompanying drawing forming part of the specification; nevertheless, it is to be understood that the invention is not confined to the disclosure, being susceptible of such changes and modifications which shall define no material departure from the salient features of the invention as expressed in the appended claim.

Figure 2:
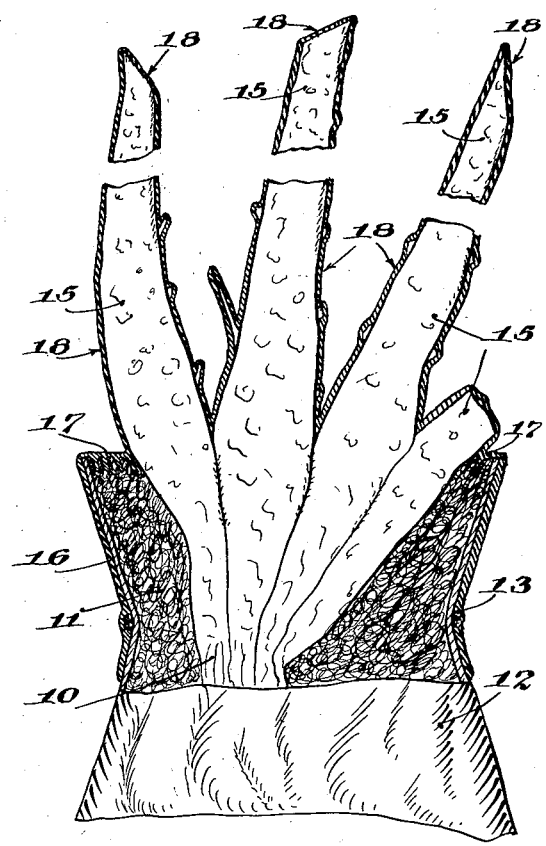

In the drawing:

Figure 1 is a view, in elevation, of a plant protected in accordance with the principles of my invention, and Figure 2 is an enlarged fragmentary vertical section of a portion of the wrapper for the roots and the covering for the stems of the plants.

Referring more particularly to the drawing, it will be seen that the roots indicated at 10 are covered by an absorbent fibrous material 11, such as Sphagnum moss, shingle tow, peat moss, which when saturated with moisture will retain the moisture for a considerable period of time. A wrapper 12 formed of waterproof and air-tight paper is carefully applied to the fibrous material. Binders in the form of a cord or wire, as indicated at 13 and 14, are applied to the opposite ends of the wrapper for rigidly securing the wrapper to the fibrous material 11. The wrapper may be formed of paper, cellophane, burlap, oil cloth, or any other material suitable for the purpose.

The plants are now in condition for the next step of protecting the plants against bacteria, insects and also against the loss of moisture. A waxy material is heated and the stems of the plants, as shown at 15, are immersed into the heated wax material. The immersion is continued until the upper end of the package enters the waxy material to provide a coating 16 around the upper inner end of the wrapper. It will also be noted that the waxy material closes the open outer end of the package, as shown at 17. It forms an integral covering with the coating or covering 18 formed on the stems 15. In the molten state, this waxy material will impregnate the inner end of the wrapper 12 and also will impregnate the fibrous material 11 at the inner end of the wrapper. If desired the entire plant, including the wrapper 12, when the wrapper is not made of waterproof material may be immersed in the molten waxy material, thereby providing not only a coating for the stems but for the entire package which will prevent the loss of moisture from any part of the package.

When the customer receives the stock it is only necessary to remove the wrapper 12 and moss 11 and plant said stock in the usual manner. The thin coating of wax on the stems 15 will not prevent the young foliage from breaking through the wax. Furthermore, since the plant has been previously protected during storage and transportation its tendency to growth will not be delayed.

The waxy material used for this purpose must be specially prepared as ordinary paraffin is too brittle and flakes off in the course of the necessary handling of the plants. While a number of compositions of ingredients may be employed, I prefer to use one form of the following ingredients:

| | Per cent |
|---|---|
| Paraffin | 80 |
| Gum elemi | 5 |
| Gum damar | 5 |
| Unrefined paraffin | 10 |

This wax or any other composition or wax which may be employed for the purpose must be ductile enough to stand necessary handling and at the same time contain no injurious ingredients as would cause damage to the tissues of the plants. Ingredients may be added to the composition which may act as repellants for rodents or insects or the waxy material may contain ingredients which will cause the destruction of rodents or insects.

The wax is melted and when the stock is dipped into the wax the temperature of the coating material may range from 150° to 230° Fr., depending upon the variety and nature of the particular plant being treated. It will be noted that at the higher temperature insect eggs and fungus bacteria will be destroyed by sterilization; at lower temperatures this may not be accomplished by sterilization but the same results will be obtained by suffocation.

It is also practical to immerse the entire plant, including the roots, in the waxy material, before wrapping which will be a considerable protection against evaporation, but the wrapping and sealing method previously described is the preferred form as the plants remain in a better condition for a much longer period than if the plants are merely waxed and shipped or stored without the wrapping.

The plant having live roots, the housing or wrapping around the root, the waxy material which is adherent to the dormant top together with the waxy sealing material at that point in the package where the housing or wrapping is tied or constricted to form a complete seal, comprises a commercial package. The housing or wrapping is constricted substantially at that point in the plant which is known as a "crown" and which is defined as that part of the plant where the roots join the top.

Nursery stock may be kept under the most unfavorable conditions for a period of at least two weeks in perfect condition. Under more favorable conditions the plants may be retained for a period amounting to approximately seventy days, while at lower temperatures, such as 32° to 40°F., the plants may be kept indefinitely. During the period of distribution by modern business methods, such as selling over counters in department, hardware and seed stores, and other similar places, the plants are subjected to evaporation usually from periods of two to six weeks. In such stores the plants are exposed to a dry atmospheric condition and high temperatures. Thus, it will be seen that without the treatment noted above the vitality of the plant is very quickly reduced to such an extent that it will be difficult, if not impossible, for the plant to resume its natural functions when planted.

I claim:

A commercial package comprising a housing and at least a plant having live roots and a dormant top, the housing being substantially moisture-proof, moisture absorbing material embracing the roots, the roots and material being embraced by the housing, the dormant top being exposed above the housing, the housing being constricted adjacent the crown of the plant, a waxy material adherent to the dormant top and coating said top, that portion of the package intervening between the housing and the top being provided with a waxy sealing means preventing escape of moisture from the interior of the housing where constricted.

CLARENCE ELLSWORTH WILSON.